United States Patent
Schmid (10) Patent No.: US 8,237,429 B2
(45) Date of Patent: Aug. 7, 2012

(54) METHOD AND DEVICE FOR MEASURING THE POLE ORIENTATION ANGLE OF A MAGNETIC LEVITATION VEHICLE ON A MAGNETIC LEVITATION TRACK

(75) Inventor: Robert Schmid, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 464 days.

(21) Appl. No.: 12/520,546

(22) PCT Filed: Dec. 14, 2007

(86) PCT No.: PCT/EP2007/064001
§ 371 (c)(1),
(2), (4) Date: Aug. 28, 2009

(87) PCT Pub. No.: WO2008/077827
PCT Pub. Date: Jul. 3, 2008

(65) Prior Publication Data
US 2010/0026291 A1 Feb. 4, 2010

(30) Foreign Application Priority Data

Dec. 21, 2006 (DE) .......................... 10 2006 061 927

(51) Int. Cl.
*G01B 7/14* (2006.01)
*G01B 7/30* (2006.01)
(52) U.S. Cl. ......... 324/207.11; 324/207.25; 324/207.26; 324/260

(58) Field of Classification Search .................. None
See application file for complete search history.

(56) References Cited

U.S. PATENT DOCUMENTS

| 3,749,990 A | * | 7/1973 | Harz ............................. 318/701 |
| 4,607,203 A |   | 8/1986 | Bohm et al. |
| 5,041,785 A |   | 8/1991 | Bogaerts et al. |
| 2007/0192000 A1 | | 8/2007 | Ellmann et al. |

FOREIGN PATENT DOCUMENTS

| DE | 3115849 A1 | 4/1982 |
| DE | 8023644 U1 | 5/1982 |
| DE | 3148007 A1 | 6/1983 |
| DE | 3433149 A1 | 3/1986 |
| DE | 69000943 T2 | 8/1993 |
| DE | 102004015496 A1 | 10/2005 |

* cited by examiner

*Primary Examiner* — Paresh Patel
(74) *Attorney, Agent, or Firm* — Laurence A. Greenberg; Werner H. Stemer; Ralph E. Locher

(57) ABSTRACT

A method for measuring the pole position of a magnetic levitation vehicle on a magnetic levitation track. The pole orientation angle between the stator magnetic field of a track side stator and the magnetic reference axis of the magnetic levitation vehicle is determined by way of measured values from magnetic field sensors. The measured values for the stator magnetic field are measured using at least three magnetic field sensors, arranged along the vehicle longitudinal direction, a field strength value is determined for each measured value from the magnetic field sensors for each magnetic field sensor position and the pole orientation angle determined from at least a subset of the measured values from the magnetic field sensors when the determined field strength values meet given minimum requirements and, if not, an error signal is generated.

24 Claims, 8 Drawing Sheets

METHOD AND DEVICE FOR MEASURING THE POLE ORIENTATION ANGLE OF A MAGNETIC LEVITATION VEHICLE ON A MAGNETIC LEVITATION TRACK

BACKGROUND OF THE INVENTION

Field of the Invention

The invention relates to a method for measurement of the pole orientation angle of a magnetic levitation vehicle of a magnetic levitation railroad, in which the pole orientation angle between the stator magnetic field of a trackside stator and the magnetic reference axis of the magnetic levitation vehicle is determined using measured values from magnetic field sensors.

Pole orientation measurement devices for magnetic levitation vehicles for measurement of the pole orientation angle are in use, for example, with Transrapid. The already-known pole orientation measurement devices are each equipped with a pair of magnetic field sensors in order to measure the stator magnetic field of the trackside stator of the magnetic railroad track. The distance between the two magnetic field sensors is normally $\tau/2$, where $\tau$ is the wavelength of the fundamental of the trackside stator magnetic field and, in the case of Transrapid is, for example, 258 mm. An evaluation device is connected to the two magnetic field sensors of the pair of magnetic field sensors and determines the pole orientation angle between the stator magnetic field of the trackside stator and the magnetic reference axis of the magnetic levitation vehicle by means of the measured values of the two magnetic field sensors. In the case of Transrapid, Hall sensors are used as measurement sensors which, by virtue of their design, measure on a directionally sensitive basis and accordingly each have a preferred measurement direction in which they are sensitive. The Hall sensors measure a predetermined direction component of the stator magnetic field, to be precise the x component of the magnetic field, that is to say the component in the vehicle longitudinal direction or direction of travel, or the z component, that is to say that component which is aligned vertically upward or downward with respect to the vehicle longitudinal direction.

BRIEF SUMMARY OF THE INVENTION

Against the background of the method of the described type, the invention is based on the object of further developing this method in order to achieve even better measurement accuracy.

According to the invention, this object is achieved by a method having the features as claimed in claim 1. Advantageous refinements of the invention are specified in the dependent claims.

The invention accordingly provides that measured values which relate to the stator magnetic field are detected by means of at least three magnetic field sensors which are arranged at a distance in the vehicle longitudinal direction, that a field strength value of the stator magnetic field is in each case determined by means of the measured values of the magnetic field sensors for each magnetic field sensor position, and that the pole orientation angle is determined by means of at least one subgroup of the measured values of the magnetic field sensors, when the determined field strength values satisfy predetermined minimum criteria and, otherwise, a fault signal is produced.

One major advantage of the invention is that the consideration of at least three magnetic field sensors makes it possible to achieve more reliable pole orientation measurement results than in the past, specifically because disturbance points in the trackside stator or in the area of the trackside stator can be identified, and errors resulting from them in the pole orientation angle value can be avoided. If, for example, it is assumed that the stator magnetic field at a disturbance point is greater or less than in undisturbed areas, then this can be identified by a comparison of the measurement results from three or more magnetic field sensors; by way of example, this makes it possible to assess only undisturbed measured values, or to produce a fault signal in the event of an excessively considerable disturbance.

The stator magnetic field component in the vehicle x direction and the stator magnetic field component in the vehicle z direction are preferably taken into account in order to form the field strength values of the stator magnetic field. For example, the field strength value of the stator magnetic field for each magnetic field sensor position is formed using:

$$Hs(x)=\sqrt{H_{sx}^2(x)+H_{sz}^2(x)}$$

where x is the magnetic field sensor position, Hsx is the stator magnetic field component in the vehicle x direction and Hsz is the stator magnetic field component in the vehicle z direction.

Particularly preferably, the stator magnetic field component in the vehicle x direction and the stator magnetic field component in the vehicle z direction are in each case measured for each magnetic field sensor position, and the field strength value is determined by means of the measured values for the stator magnetic field component in the vehicle x direction and for that in the vehicle z direction. In this case, the field strength value is therefore formed exclusively by means of measured magnetic field components which are related to the respective magnetic field position.

Alternatively, either the stator magnetic field component in the vehicle x direction or the stator magnetic field component in the vehicle z direction can be measured in each case for each magnetic field sensor position; in this case, by way of example, the respective other stator magnetic field component is determined by computation for each magnetic field sensor position, to be precise by means of a measured value at a position offset forward or backward by $\tau/2$ in the vehicle longitudinal direction, where $\tau$ the wavelength of the fundamental of the trackside stator magnetic field. The field strength value is therefore in this case formed by means of measured values which originate from different measurement positions.

Two field strength values can in each case be determined for each magnetic field sensor position, with one of the field strength values being formed by means of the stator magnetic field component measured at the magnetic field sensor position and by means of the stator magnetic field component measured offset forward by $\tau/2$ in the vehicle longitudinal direction, and with the other field strength value being formed by means of the stator magnetic field component measured at the magnetic field sensor position, and by means of the stator magnetic field component measured offset backward by $\tau/2$ in the vehicle longitudinal direction. In this case, for example, measured values at a magnetic field sensor position are taken into account only when at least one of the field strength values which are formed for the respective magnetic field sensor position satisfies the predetermined minimum criteria.

For example, the method can be carried out in such a way that the stator magnetic field component in the vehicle x direction is in each case measured for each magnetic field sensor position by means of the magnetic field sensor arranged at this position, and in such a manner that the associated stator magnetic field component in the vehicle z direction is determined by computation for this position, to be precise by means of the measured value in the vehicle x direction of that magnetic field sensor which is offset forward or backward by τ/2 in the vehicle longitudinal direction with respect to this magnetic field sensor position. Each measured value measured in the vehicle x direction is preferably used at least twice for each magnetic field sensor position, specifically once as measured value in the vehicle x direction for the respective magnetic field sensor position and at least once as the measured value in the vehicle z direction for a magnetic field sensor position which is offset forward or backward by τ/2 in the vehicle longitudinal direction.

Alternatively, the method can also be carried out in such a manner that the stator magnetic field component in the vehicle z direction is in each case measured for each magnetic field sensor position by means of the magnetic field sensor arranged at this position, and in such a manner that the associated stator magnetic field component in the vehicle x direction is determined by computation for this position, to be precise by means of the measured value in the vehicle z direction of that magnetic field sensor which is offset forward or backward by τ/2 in the vehicle longitudinal direction with respect to this magnetic field sensor position. By way of example, each measured value measured at this position in the vehicle z direction is used at least twice for each magnetic field sensor position, specifically once as a measured value in the vehicle z direction for the respective magnetic field sensor position, and at least once as a measured value in the vehicle x direction for a magnetic field sensor position which is offset forward or backward by τ/2 in the vehicle longitudinal direction.

The measured values of the magnetic field sensors are preferably subdivided into at least two measured value subgroups, with the measured values in a first measured value subgroup being used to form the pole orientation angle, and with the measured values of the other measured value subgroups being rejected.

For example, it is possible to determine a minimum possible field strength window which contains a predetermined number of field strength values on the basis of the determined field strength values. In this case, the measured values for those magnetic field sensor positions for which the associated field strength value is located within the field strength window are used to form the pole orientation angle, and the other measured values are rejected.

The predetermined number of field strength values which must be located within the field strength window is, for example, at least 50% of the available field strength values.

The window size of the field strength window is preferably determined, and a fault signal is produced if the field strength window exceeds a maximum window size. By way of example, the maximum window size can be determined as a function of the mean value of the field strength values which are located within the field strength window. The maximum window size is preferably less than ±25%, preferably less than ±10%, of the mean value of the field strength values which are located within the field strength window.

Alternatively or additionally, it is possible to check whether a minimum number of field strength values which are located within the first measured value group or within the field strength window belong to magnetic field sensor positions which are directly adjacent: if yes, the measured values are assessed, otherwise a fault signal is produced. By way of example, the minimum number may be predetermined and may be fixed. Alternatively, the minimum number may be defined as a function of the number of field strength values which are located within the first measured value group or within the field strength window.

Alternatively or additionally, it is possible to check whether the minimum field strength value which is located within the first measured value group or within the field strength window exceeds a predetermined minimum value: if yes, the measured values are assessed, otherwise a fault signal is produced.

Alternatively or additionally, a mean value can be formed by means of the field strength values of the magnetic field sensors: if the mean value exceeds a predetermined minimum value, the measured values are assessed, otherwise a fault signal is produced.

It is also possible for the method to be carried out such that a variance value is determined by means of the field strength values and such that the measured values of the magnetic field sensors are used to form the pole orientation angle if the variance value is less than a predetermined maximum variance value, and such that, otherwise, a fault signal is produced.

The invention also relates to a pole orientation measurement device for a magnetic levitation vehicle of a magnetic levitation railroad having an evaluation device which determines the pole orientation angle between the stator magnetic field of a trackside stator and the magnetic reference axis of the magnetic levitation vehicle by means of measured values of magnetic field sensors. A pole orientation measurement device such as this is likewise known from Transrapid.

Against this background, the invention is based on the object of specifying a pole orientation measurement device which is even more accurate than in the past.

According to the invention, this object is achieved in that at least three magnetic field sensors, which are arranged at a distance in the vehicle longitudinal direction, are connected to the evaluation device, and the evaluation device is designed such that it determines a field strength value of the stator magnetic field in each case by means of the measured values of the magnetic field sensors for each magnetic field sensor position and forms the pole orientation angle by means of at least one subgroup of the measured values of the magnetic field sensors when the determined field strength values satisfy predetermined minimum criteria, and in that, otherwise, it produces a fault signal.

With regard to the advantages of the pole orientation measurement device according to the invention and with regard to the advantages of advantageous refinements of the pole orientation measurement device according to the invention, reference is made to the above statements relating to the method according to the invention, since the advantages of the method according to the invention correspond essentially to the advantages of the pole orientation measurement device according to the invention.

The evaluation device preferably has a data processing device which is programmed such that it can evaluate the measured values of the magnetic field sensors as described above.

The magnetic field sensors may be arranged at equal distances, for example along a line which runs parallel adjacent to or in the direction of travel in front of or behind the supporting magnets of the magnetic levitation vehicle.

The invention will be explained in more detail in the following text with reference to exemplary embodiments; in the figures, by way of example:

DESCRIPTION OF THE INVENTION

For clarity reasons, the same reference signs are used for identical or comparable components in FIGS. 1 to 10.

Figure 1:
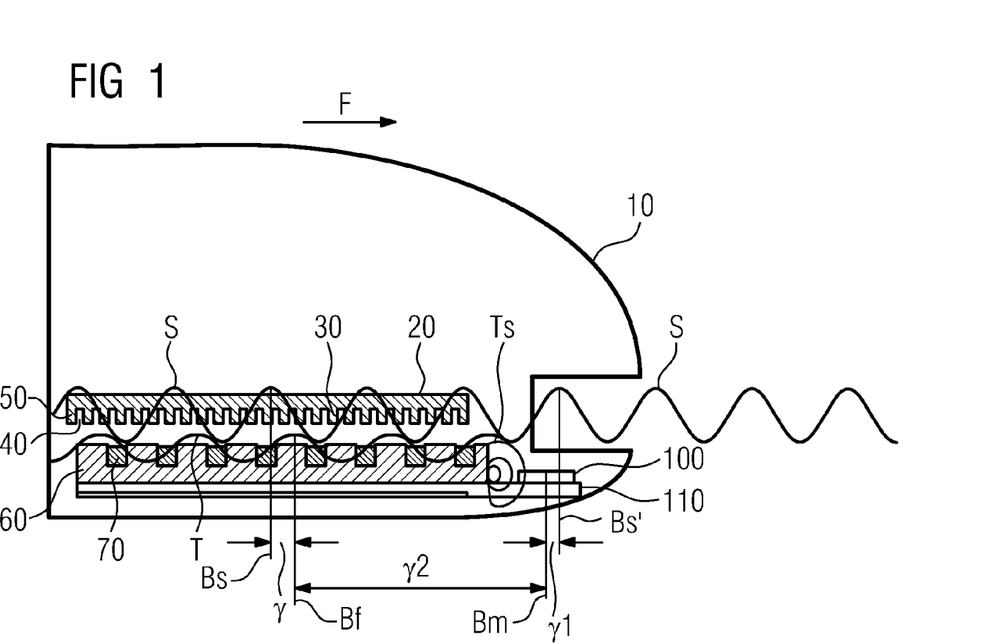
FIG. 1 shows a magnetic levitation vehicle with one exemplary embodiment of a pole orientation measurement device according to the invention.

FIG. 1 shows the front area of a magnetic levitation vehicle 10 which is located on a magnetic levitation railroad track 20. Of the magnetic levitation railroad track, FIG. 1 shows a trackside stator 30, which is equipped with stator slots 40 and stator teeth 50.

Magnet coils, which are not illustrated in any more detail in FIG. 1, for production of a stator magnetic field, are located in the stator slots 40. The fundamental of the stator magnetic field is annotated with the reference sign S in FIG. 1. The arrangement and the orientation of the magnet coils define a magnetic reference axis Bs of the stator 30.

FIG. 1 illustrates only a section of the stator 30; the stator 30 extends over the entire track of the magnetic levitation railroad and therefore also produces the stator magnetic field S in front of the magnetic levitation vehicle 10—as can be seen in FIG. 1.

In addition, FIG. 1 shows a front supporting magnet 60 of the magnetic levitation vehicle 10; this is equipped with magnet coils 70 which produce a supporting magnetic field in order to lift the magnetic levitation vehicle 10. The supporting magnet field is annotated with the reference sign T in FIG. 1. The arrangement and the orientation of the supporting magnet 60 define a magnetic reference axis Bf of the magnetic levitation vehicle 10.

A pole orientation measurement device 100 is fitted in front of the supporting magnet 60 in the direction of travel F; the purpose of the pole orientation measurement device 100 is to determine the pole orientation angle γ between the magnetic reference axis Bs of the stator and the magnetic reference axis Bf of the magnetic levitation vehicle 10.

By way of example, the pole orientation measurement device 100 is mounted with the supporting magnet 60 on a common mount 110 of the magnetic levitation vehicle 10.

Figure 2:
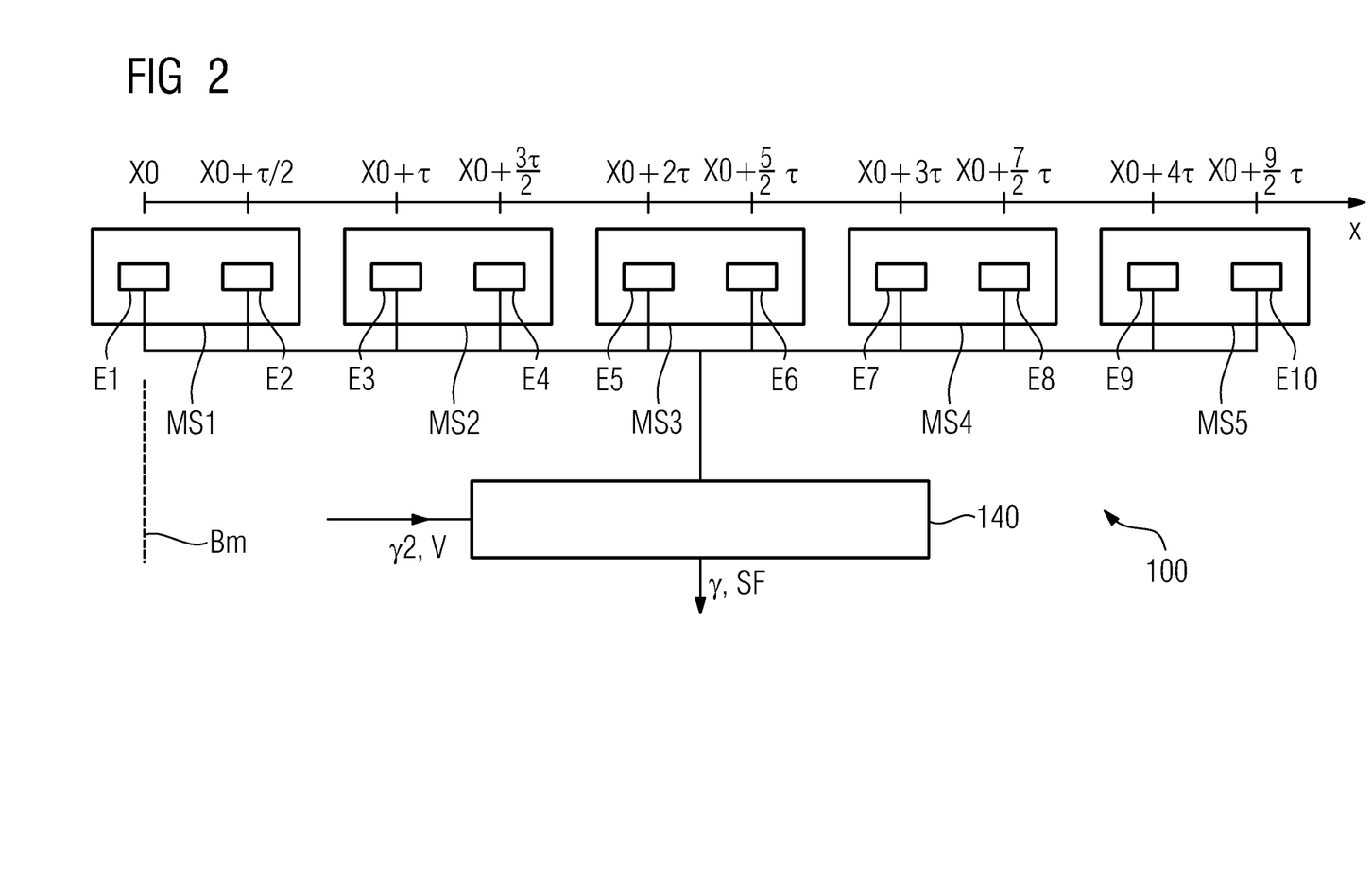
FIG. 2 shows the first exemplary embodiment for the pole orientation measurement device as shown in FIG. 1, in detail.

A first exemplary embodiment of the pole orientation measurement device 100 as shown in FIG. 1 is shown in the form of an enlarged illustration in FIG. 2. The pole orientation measurement device 100 has a sensor group with five directionally selective magnetic field sensors MS1 to MS5 for measurement of the stator magnetic field S of the trackside stator 30 (cf. FIG. 1). Each of the magnetic field sensors MS1 to MS5 in each case has two individual sensors, which are arranged with a distance τ/2 between them, where τ is the wavelength of the fundamental of the stator magnetic field; the individual sensors are annotated with the reference symbols E1 to E10. If, for example, the wavelength τ is 258 mm, the distance τ/2 is, for example, 129 mm. However, in principle, shorter distances are also possible, provided that the measured values from the individual sensors are appropriately corrected; however, this will not be described in any more detail here, for clarity reasons.

One of the magnetic field sensors, in this case by way of example the magnetic field sensor MS1, is arranged at the point x0 and forms a measurement reference axis Bm of the pole orientation measurement device 100. By way of example, the magnetic field sensors may be formed by Hall sensors or magnetoresistive sensors.

In addition, the pole orientation measurement device 100 has an evaluation device 140 which is connected to the magnetic field sensors MS1 to MS5 and whose purpose is to determine, for example to calculate, the pole orientation angle γ by means of the measured values from the individual sensors E1 to E10 and therefore from the magnetic field sensors MS1 to MS5. By way of example, the evaluation device 140 may be formed by a programmable microprocessor device.

The magnetic field sensors MS1 to MS5 each have a preferred measurement direction; the preferred measurement direction indicates which magnetic field components the magnetic field sensors can measure, or the measurement directions to which they are sensitive. In the illustration shown in FIG. 2, the individual sensors or the magnetic field sensors are aligned, for example, such that they can measure the x component of the magnetic field; when aligned in this way, they are accordingly not sensitive to the z component.

The evaluation device 140 determines the pole orientation angle γ by means of the measured values from the magnetic field sensors MS1 to MS5. For this purpose, it first of all measures an auxiliary pole orientation angle γ1 between the measurement reference axis Bm of the pole orientation measurement device 100 and an auxiliary reference axis BS', which is offset by a multiple of 2π with respect to the magnetic reference axis Bs of the stator 30 (cf. FIG. 1).

It adds to the auxiliary pole orientation angle γ1 an offset angle γ2, which indicates the phase-angle offset between the magnetic reference axis Bf of the magnetic levitation vehicle 10 and the measurement reference axis Bm of the pole orientation measurement device 100. Integer multiples of 2π contained therein are subtracted from the resultant sum value γ1+γ2, thus forming the sought pole orientation angle γ. Mathematically speaking, the equation for calculation of the pole orientation angle γ is therefore:

$$\gamma = (\gamma 1 + \gamma 2) \bmod (2 * \pi)$$

The offset angle γ2, which indicates the phase-angle offset between the magnetic reference axis Bf of the magnetic levitation vehicle 10 and the measurement reference axis Bm of the pole orientation measurement device 100 is determined as a function of the mechanical offset V using:

$$\gamma 2 = V / \tau * \pi$$

The offset angle γ2 is predetermined and is fixed, for example, for the evaluation device 140, and is stored in the evaluation device 140. Alternatively, the offset V can also be predetermined and be fixed for the evaluation device 140 and can be stored in it; in this case, the evaluation device 140 calculates the offset angle γ2 itself, using the quoted formula. The evaluation device 140 has an input connection E140 in order to input the offset V or the offset angle γ2. In order to explain how the evaluation device 140 can form the auxiliary pole orientation angle γ1 by means of the measured values from the sensor group, the following text first of all explains, with reference to FIGS. 3 and 4, how a single pole orientation angle γ1' (x0) can be determined for the magnetic field sensor position x0 of the magnetic field sensor MS1 by means of the measured values from the individual sensors E1 and E2, when the preferred measurement directions of the magnetic field sensors are aligned along the x direction, that is to say the vehicle longitudinal direction, and therefore measure the x component of the magnetic field.

Figure 3:
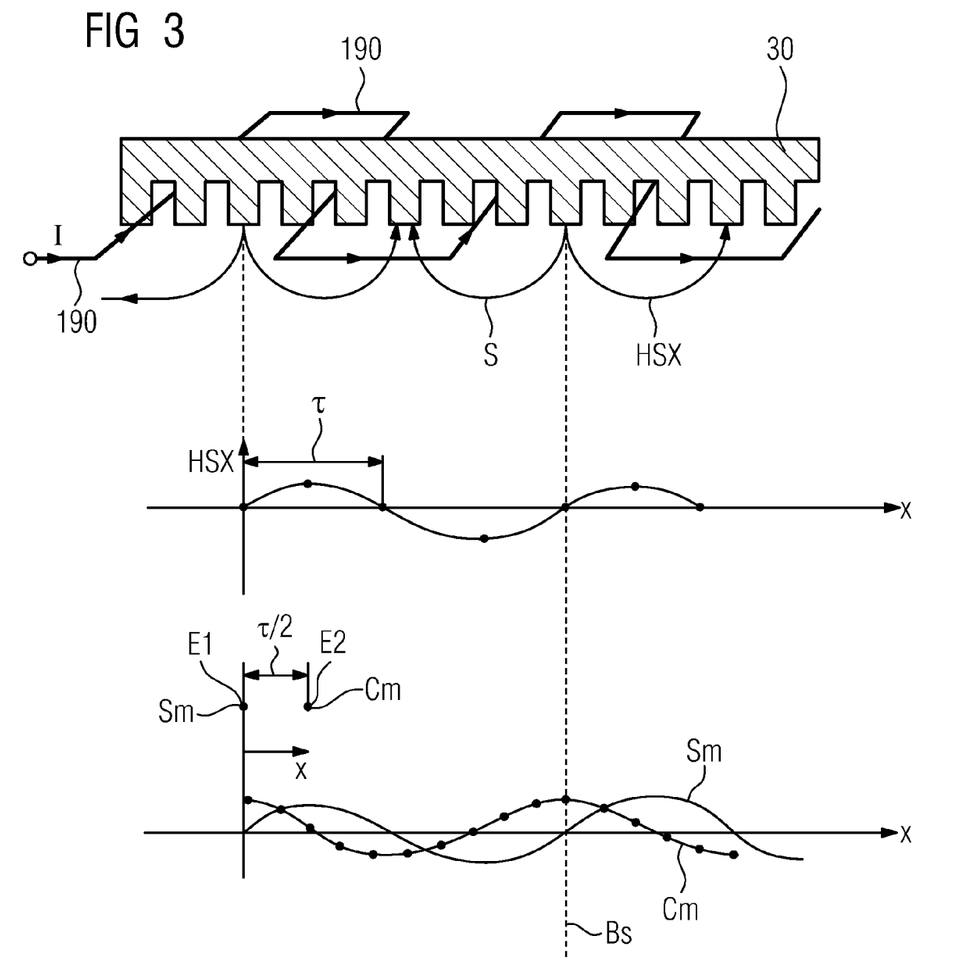
FIG. 3 shows measured value profiles in order to explain the method of operation of the pole orientation measurement device as shown in FIG. 2, for the case in which the magnetic field component is measured in the x direction.

The upper part of FIG. 3 shows the trackside stator 30; by way of example, a line 190 is shown which belongs to the conductor coils arranged in the stator 30. The figure also shows the field profile of the x component Hsx of the magnetic field strength of the stator magnetic field S.

The central section of FIG. 3 shows the profile of the amplitude Hsx of the magnetic field strength Hs in the vehicle longitudinal direction x. As can be seen, the field strength has a sinusoidal profile.

The lower section of FIG. 3 shows the individual sensors E1 and E2; the distance A between them is in this case τ/2, as a result of which the two individual sensors produce mutually orthogonal measurement signals. By way of example, it is now assumed that the individual sensor E1 produces measured values Sm on the sine track, and that the individual sensor E2 produces measured values Cm on the cosine track; this means that the individual sensor E1 produces a sinusoidal profile as the measurement signal when it is moved forward in the direction of travel, starting from the point x=0, and that the individual sensor E2 produces a cosine profile as the measurement signal when it is moved forward in the direction of travel, starting from the point x=0. With movement in the x direction, the individual pole orientation angle γ1' of the pair of sensors E1 and E2 changes in a corresponding manner relative to the reference axis Bs.

In this case, mathematically, the measured value profiles are:

$$Sm(x) = H0 \cdot \sin\left(\frac{x}{\tau} \cdot 2\pi\right) = H0 \cdot \sin(\gamma 1)$$

$$Cm(x) = H0 \cdot \cos\left(\frac{x}{\tau} \cdot 2\pi\right) = H0 \cdot \cos(\gamma 1)$$

where H0 is the signal amplitude of the magnetic field, which is approximately equal for both individual sensors.

The individual pole orientation angle γ1' (x0) can therefore be determined as follows:

$$\frac{Sm(x0)}{Cm(x0)} = \frac{H0 \cdot \sin(\gamma 1)}{H0 \cdot \cos(\gamma 1)}$$

$$\Rightarrow \gamma 1'(x0) = \mathrm{atan2}\left[\frac{Sm(x0)}{Cm(x0)}\right]$$

In this case, as is known, the function a tan 2 means the reciprocal function of the angle function tangent for which a validity range from −π to +π, that is to say one complete cycle of the sought angle γ1, is achieved, in addition to the quotient tan(x)=sin(x)/cos(x), by taking account of the mathematical sign of the vector; the function a tan(x) is in contrast defined only in the range −π/2 to +π/2.

Figure 4:
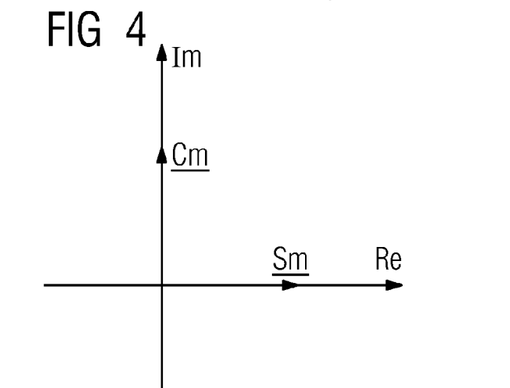
FIG. 4 shows complex measurement vectors relating to the measured value profiles as shown in FIG. 3.

For further explanation, FIG. 4 also shows the associated vector representation of the measured values Sm and Cm. As can be seen, the two vectors $\underline{Sm}$ and $\underline{Cm}$ are mutually perpendicular.

In a corresponding manner, corresponding individual pole orientation angles γ1'(x0+τ), γ1'(x0+2*τ), γ1'(x0+3*τ) and γ1'(x0+4*τ) can now be formed for the magnetic field sensors MS2 to MS5 and therefore for the positions x0+τ, x0+2*τ, x0+3*τ and x0+4*τ, by evaluating the corresponding measured values from the magnetic field sensors MS2 to MS5.

The resultant auxiliary pole orientation angle γ1 can now be calculated for example by forming the average of the individual pole orientation angles γ1'(x0+i*τ), for example as follows:

$$\gamma 1 = \frac{1}{k}\sum_{i=0}^{k} \gamma 1'(x0 + i \cdot \tau) - \gamma k(i \cdot \tau)$$

where k is the number of determined individual pole orientation angles and the number of magnetic field sensors (in this case k=4) and γk(i*τ) takes account of the pole orientation angle offset between the points x0 and x0+i*τ. γk(i*τ) is given by:

$$\gamma k(i*\tau) = i*\pi$$

The described averaging process leads to results which can be readily assessed while, provided that the stator magnetic field S does not have any disturbance points along the x direction. If any such disturbance points are present, it is no longer possible to assess all the individual pole orientation angles, because they are subject to errors.

Figure 5:
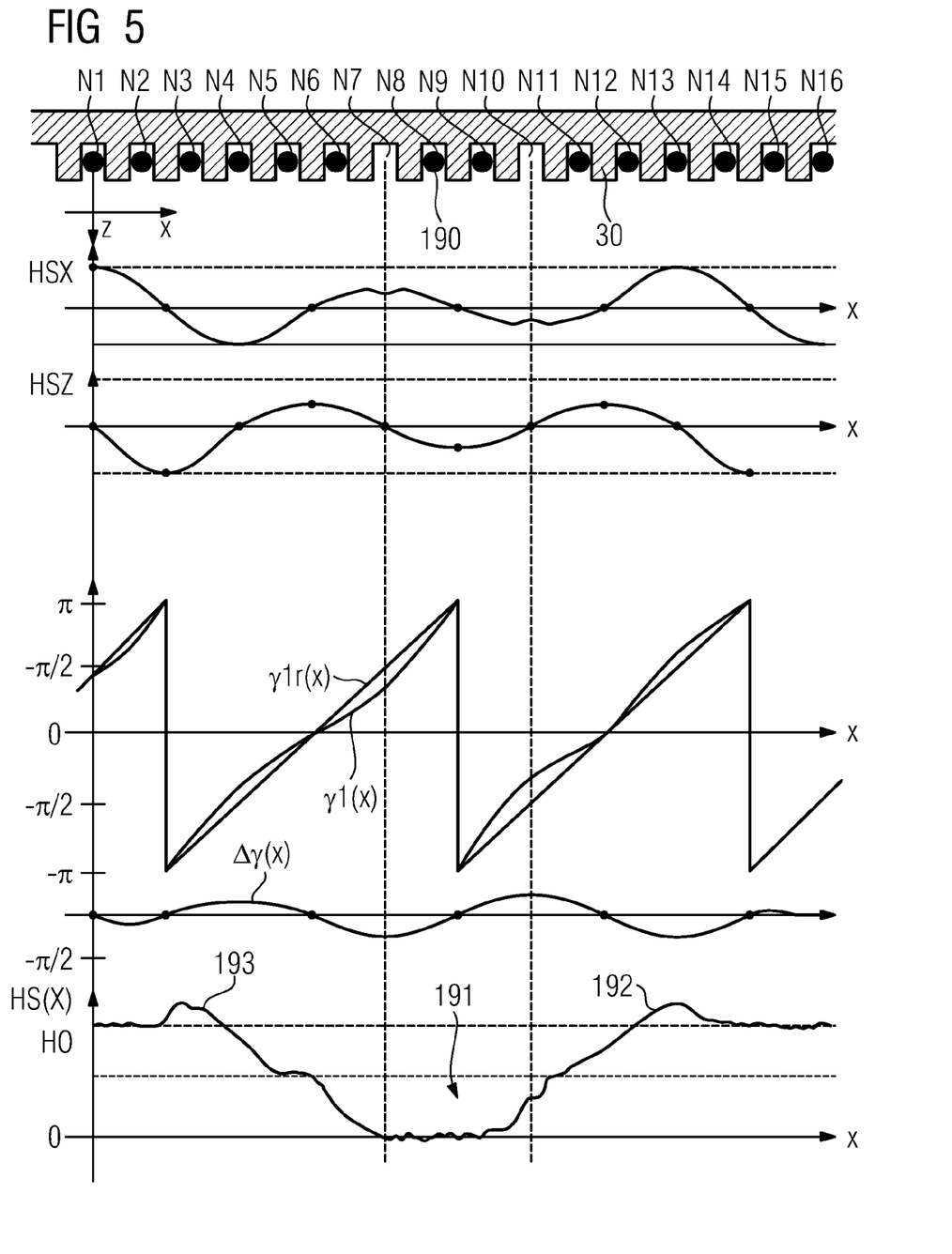
FIG. 5 shows measured value profiles in the case in which there are disturbance points in the trackside stator.

In order to explain this in more detail, FIG. 5 shows a trackside stator 30 in which the stator magnetic field S is not excited uniformly along the x direction because the stator slots N7 and N10 from the stator slots N1 to N16 are not equipped with conductors 190. As can be seen, both the horizontal field component Hsx of the field strength vector $\overline{Hs}$ and the vertical field component Hsz of the field strength vector Hs are affected by this disturbance.

The field strength vector $\overline{Hs}$ of the stator magnetic field S can be mathematically described, approximately, as follows:

$$\underline{Hs} = \begin{pmatrix} Hsx \\ Hsz \end{pmatrix} = \begin{pmatrix} H0 \cdot \sin\left(\omega \cdot t - \frac{x \cdot \pi}{\tau}\right) \\ H0 \cdot \cos\left(\omega \cdot t - \frac{x \cdot \pi}{\tau}\right) \end{pmatrix}$$

where Hsx is the x component of the field strength vector Hs, and Hsz is the z component of the field strength vector Hs; the y component of the field strength vector is approximately equal to zero.

The magnitude Hs of the field strength vector $\underline{Hs}$ is calculated as follows:

$$|Hs(x)| = Hs(x) = \sqrt{Hsx^2(x) + Hsz^2(x)}$$

and is ideally approximately constant:

$$Hs(x) \approx H0.$$

The magnitude Hs of the field strength vector Hs forms a field strength value of the stator magnetic field $\overline{S}$ which is affected by the disturbance or the faulty stator winding. By way of example, FIG. 5 likewise illustrates the profile of the field strength value Hs. As can be seen, the field strength value Hs in the area 191 of the empty slots N7 and N10 falls, and there is an increased field strength value Hs before and after this area; the areas with an increased field strength value are annotated by reference signs 192 and 193. The field strength peak can be explained by the fact that the absence of the field in the area of the slots N7 and N10 means that there are no compensating field components which would reduce the magnitude of the field in the edge area.

If this disturbance of the stator magnetic field S is ignored, by forming the average, as already described, of the individual pole orientation angles γ1'(x0+i*τ) as follows:

$$\gamma 1 = \frac{1}{k}\sum_{i=0}^{k} \gamma 1'(x0 + i \cdot \tau) - \gamma k(i \cdot \tau)$$

then this results in errors in the determination of the auxiliary pole orientation angle γ1, as can likewise be seen in FIG. 5. By way of example, FIG. 5 shows the auxiliary pole orientation angle γ1(x) calculated by forming the average, the theoretically correct angle profile γ1r(x) and the resultant angle error Δγ(x). The angle error Δγ(x) is calculated as follows:

$$\Delta\gamma(x) = \gamma 1(x) - \gamma 1 r(x)$$

In order now to exclude from the determination of the auxiliary pole orientation angle γ1 those individual pole orientation angles γ1'(x0+i*τ) which are affected by this disturbance, the respectively associated field strength value Hs(x0+i*τ) of the stator magnetic field is firstly determined for each magnetic field sensor position x0+i*τ, to be precise as follows:

$$Hs(x0+i*\tau) = \sqrt{M^2(x0-i*\tau) + M^2(x0+i*\tau+\tau/2)}$$

where M(x0+i*τ) is the measured value of the field component Hsx of the individual sensor which is located at the point (x0+i*τ), and M(x0+i*τ+τ/2) is the measured value of the field component Hsx of the individual sensor which is located at the point x0+i*τ+τ/2.

Figure 6:
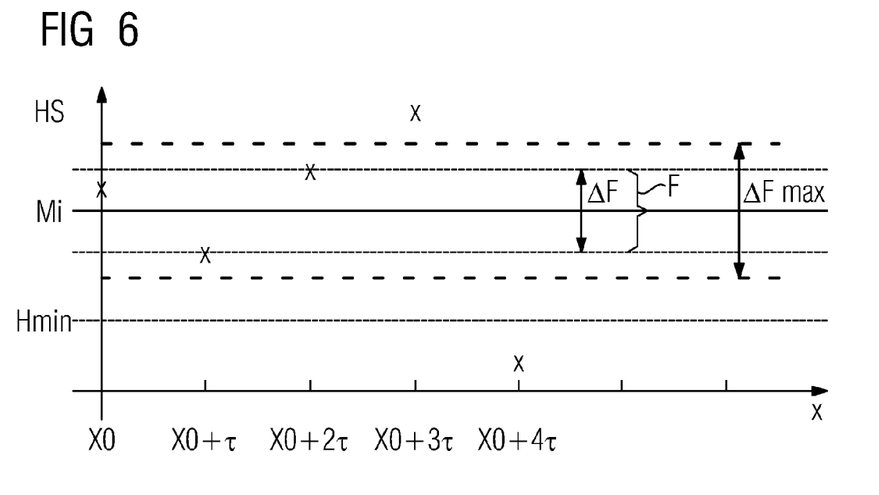
FIG. 6 shows measured values of the magnetic field sensors of the pole orientation measurement device as shown in FIG. 2.

By way of example, FIG. 6 shows a measurement distribution for the five field strength values Hs(x0+i*τ). As can be seen, three field strength values Hs(x0), HS(x0+τ) and HS(x0+2*τ), that is to say more than 50% of the five available field strength values, are located within a field strength window F. The window size ΔF of the field strength window is smaller than a maximum window size ΔFmax, which is likewise indicated by a dashed line. By way of example, the maximum window size ΔFmax is ±10% of the average value of the three field strength values Hs(x0), HS(x0+τ) and HS(x0+2*τ) which are located within the field strength window. In addition, the lowest field strength value exceeds a predetermined minimum value Hmin within the field strength window F. In addition, a minimum number (in this case by way of example three) of field strength values which are located within the field strength window F are directly adjacent to one another. Since all of these criteria are satisfied, the resultant auxiliary pole orientation angle γ1 can now be calculated by means of the measured values from the three magnetic field sensors MS1, MS2 and MS3 whose field strength values are located within the field strength window F by using these measured values to determine the corresponding three individual pole orientation angles γ1'(x0), γ1'(x0+τ) and γ1'(x0+2*τ) and the auxiliary pole orientation angle γ1 is then calculated using the latter, otherwise a fault signal SF is determined which indicates that the measured values are unsuitable for pole orientation determination.

In the present case, the auxiliary pole orientation angle is calculated as follows:

$$\gamma 1 = \frac{1}{k}\sum_{i=0}^{2} \gamma 1'(x0 + i \cdot \tau) - \gamma k(i \cdot \tau)$$

The individual pole orientation angles γ1'(x0+3*τ) and γ1'(x0+4*τ) are ignored because the field strength values of the associated magnetic field sensors MS4 and MS5 are located outside the field strength window.

Figure 7:
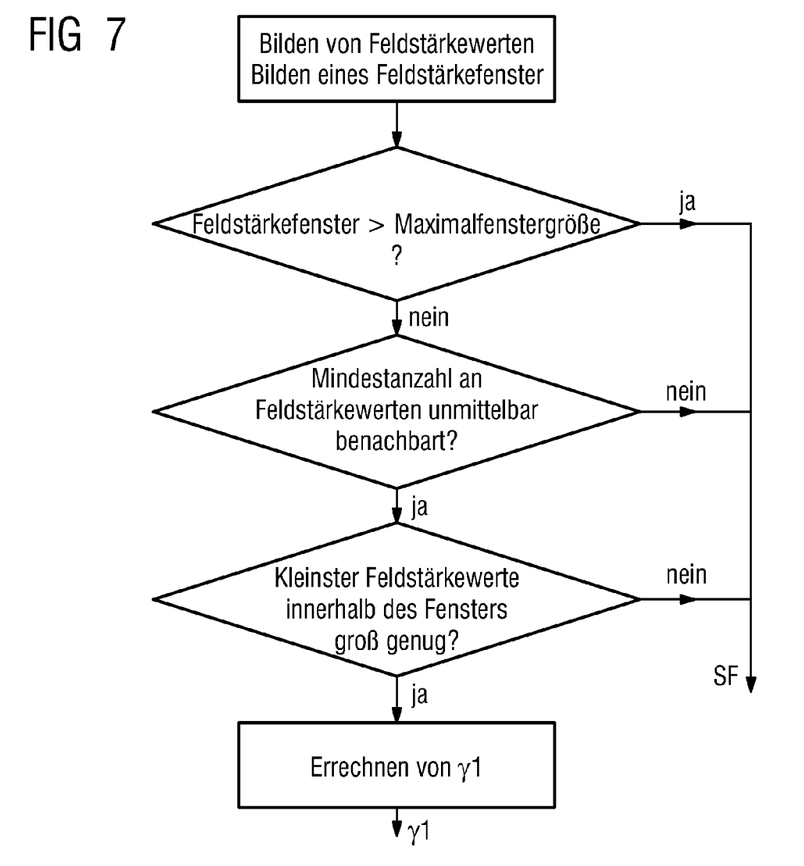
FIG. 7 shows a flowchart in order to explain the method of operation of the pole orientation measurement device as shown in FIG. 2.

By way of example, the field strength window F can be determined by first of all averaging the field strength values of all of the magnetic field sensors; the field strength window F is then placed around this mean value and is enlarged until 50% of the field strength values are included. If the resultant window size is then smaller than, for example, ±10% of the average value of the field strength values which are located within the field strength window, then these are still used, otherwise a fault signal is produced, which indicates that the measured values cannot be used to form a plausible pole orientation angle value. By way of example, FIG. 7 shows an algorithm to determine whether the measured values should be used to form an auxiliary pole orientation angle γ1.

In a mathematically general form, the equation for the auxiliary pole orientation angle γ1 is, for example:

$$\gamma 1 = \frac{1}{k}\sum_{i=0}^{k-1} Q(i) \cdot [\gamma 1'(x0 + i \cdot \tau) - \gamma k(i \cdot \tau)]$$

where Q(i) indicates whether the respective individual pole orientation angle γ1'(x0+i*τ) should (Q(i)=1) or should not (Q(i)=0) be formed and used.

As an alternative to the described window formation process, the auxiliary pole orientation angle γ1 can also be determined in a different manner: first of all, a mean value is formed by means of the field strength values from the magnetic field sensors. If the mean value exceeds a predetermined minimum value, then the valuation process is continued, otherwise a fault signal is produced. The field strength values from the magnetic field sensors are then used to determine a variance value: if the variance value is less than a predetermined maximum variance value, the auxiliary pole orientation angle γ1 is formed using all the measured values, otherwise a fault signal is produced. Alternatively, the auxiliary pole orientation angle γ1 can also be formed using a smaller number of measured values, specifically only those which are associated with field strength values which are located within the measured value interval defined by the variance.

Figure 8:
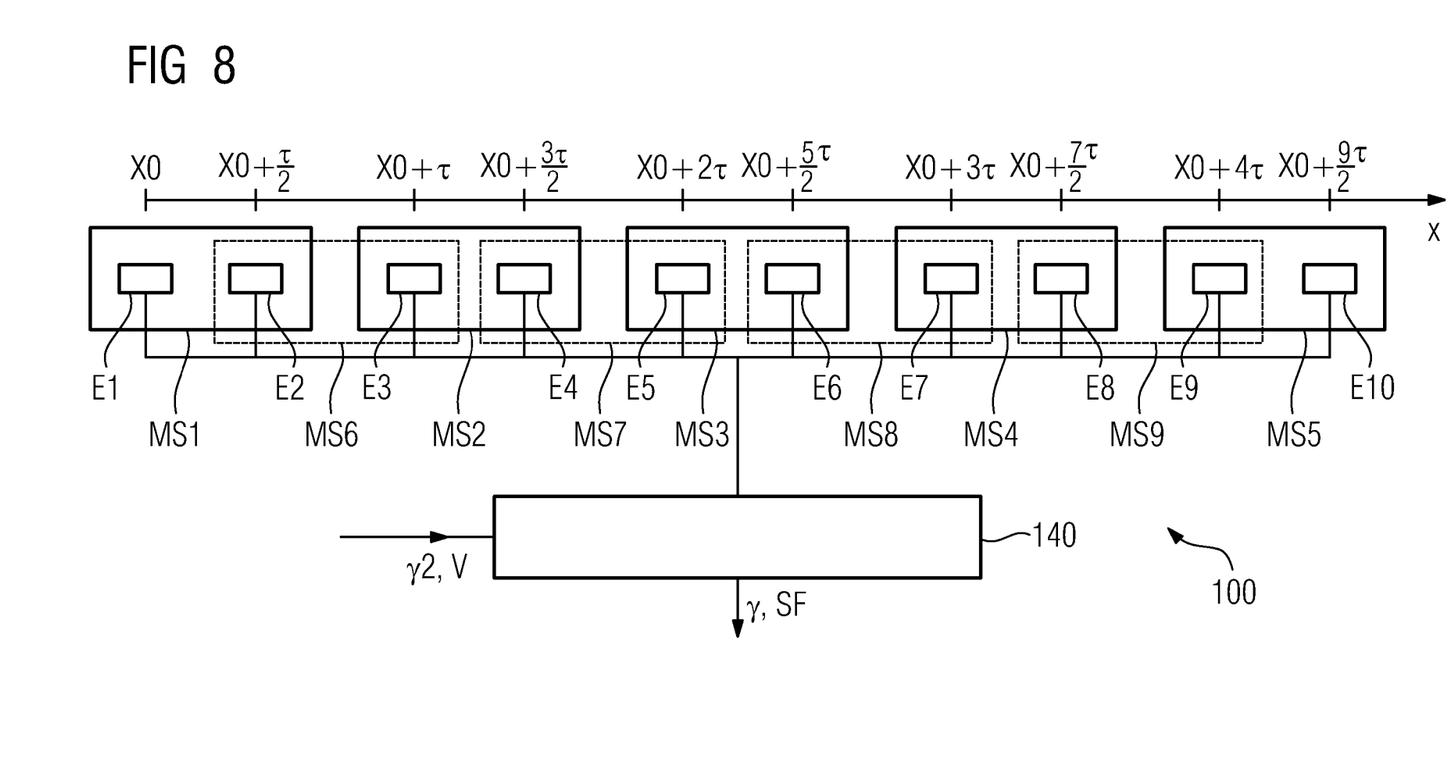
FIG. 8 shows a second exemplary embodiment of a pole orientation measurement device.

A second exemplary embodiment of the pole orientation measurement device 100 as shown in FIG. 2 is illustrated in more detail in FIG. 8. In contrast to the first exemplary embodiment, the measured values from the individual sensors are evaluated "in a duplicated form", in that virtual additional magnetic field sensors MS6 to MS9 are formed by means of the measured values from the individual sensors E1 to E10. This will be explained in more detail using the example of the virtual magnetic field sensor MS6, which is formed by the individual sensors E2 and E3.

It is assumed for the magnetic field sensor MS6 that the individual sensor E2 produces measured values Sm on the sine track, and the individual sensor E3 produces measured values Cm on the cosine track; this means that the individual sensor E2 produces a sinusoidal profile as the measurement signal when it is moved forward in the direction of travel starting from the point x=0+τ/2, and that the individual sensor E3 produces a cosine profile as the measurement signal when it is moved forward in the direction of travel starting from the point x=0+τ/2. The individual pole orientation angle γ1' relative to the reference axis Bs changes in a corresponding manner with movement in the x direction.

The individual pole orientation angle γ1'(x0+τ/2) can therefore determined as follows:

$$\frac{Sm(x0+\tau/2)}{Cm(x0+\tau/2)} = \frac{H0 \cdot \sin(\gamma 1'(x0+\tau/2))}{H0 \cdot \cos(\gamma 1'(x0+\tau/2))}$$

$$\Rightarrow \gamma 1'(x0+\tau/2) = \operatorname{atan2}\left[\frac{Sm(x0+\tau/2))}{Cm(x0+\tau/2))}\right]$$

In a mathematically general form, the equation for the auxiliary pole orientation angle γ1 is in this case:

$$\gamma 1 = \frac{1}{5}\sum_{i=0}^{4} Q(i) \cdot \left[\begin{array}{c}\gamma 1'(x0+i\cdot\tau) - \\ \gamma k(i\cdot\tau)\end{array}\right] + \frac{1}{4}\sum_{i=6}^{9} Q'(i) \cdot \left[\begin{array}{c}\gamma 1'\left(\begin{array}{c}x0+i\cdot\tau+\\ \tau/2\end{array}\right) - \\ \gamma k(i\cdot\tau+\tau/2)\end{array}\right]$$

where Q'(i) indicates whether the measured values from the corresponding magnetic field sensor MS6 to MS9 should (Q'(i)=1) or should not (Q'(i)=0) be used. γk(i·τ+τ/2) is given by:

$$\gamma k(i^*\tau+\tau/2) = i^*\pi+\pi/2$$

By way of example, the first and second exemplary embodiments have been based on the assumption that the individual sensors E1 to E10 measure the horizontal field component Hsx; the auxiliary pole orientation angle γ1 may, of course, also be determined using the vertical field component Hsz. All that is necessary when forming the auxiliary pole orientation angle γ1 is to take account of the fact that the horizontal field component Hsx and the vertical field component Hsz are offset through 90°, which must be compensated for in the pole orientation determination process by an appropriate angle correction when, for example, the magnetic reference axis (Bf) of the magnetic levitation vehicle relates to the horizontal field component Hsx of the stator magnetic field, but the vertical field component of the stator magnetic field is intended to be measured; a corresponding situation applies to the opposite case.

If the aim, for example, is to determine the auxiliary pole orientation angle γ1 using the vertical field components, even though the pole orientation angle relates to the horizontal field component of the stator magnetic field, then it is first of all possible to adopt the procedure as described above; the resultant auxiliary pole orientation angle γ1 (vertical) is then simply converted to a "horizontal auxiliary pole orientation angle γ1 (horizontal)", using:

$$\gamma 1(\text{horizontal}) = \gamma 1(\text{vertical}) + \pi/2$$

Figure 9:
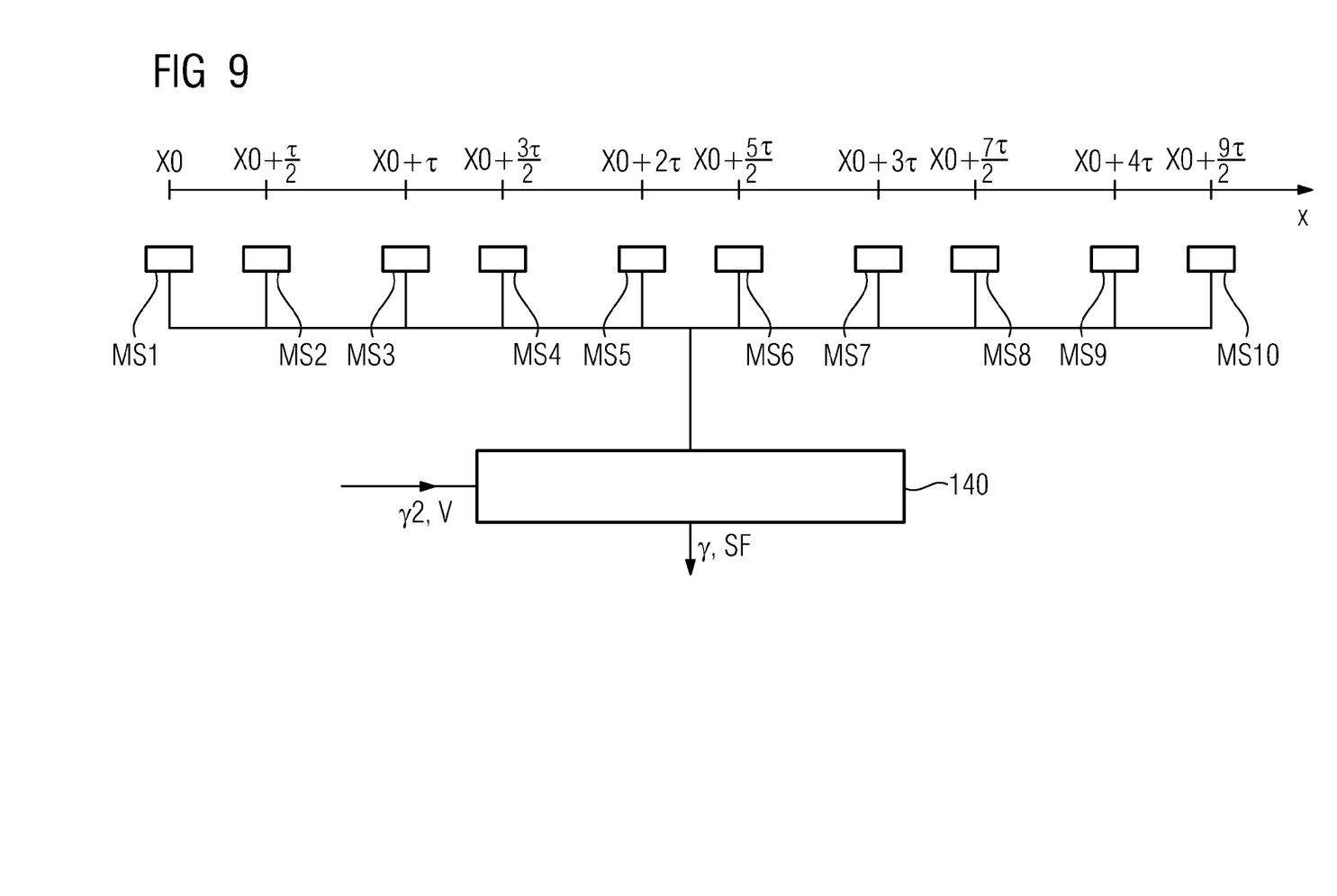
FIG. 9 shows a third exemplary embodiment of a pole orientation measurement device, in which the magnetic field sensors each measure in two orthogonal directions.

FIG. 9 shows a third exemplary embodiment of a pole orientation measurement device. In contrast to the first and second exemplary embodiments, both the horizontal field component Hsx and the vertical field component Hsz of the stator magnetic field are measured by each magnetic field sensor MS1 to MS10 at each measurement point, thus making it possible to determine a respective field strength value Hs(x) for each magnetic field sensor position x, by means of measured values which relate to one and the same measurement point x. The field strength values Hs(x0+i*τ) of the stator magnetic field are then determined as follows:

$$Hs(x0+i^*\tau) = \sqrt{Mx^2(x0+i^*\tau) + Mz^2(x0+i^*\tau)}$$

where Mx(x0+i*τ) is the measured value for the x component at the point (x0+i*τ) and Mz(x0+i*τ) is the measured value for the z component at the point x0+i*τ.

In addition, the auxiliary pole orientation angle γ1 can then be evaluated and calculated, as has been explained above in conjunction with the first and second exemplary embodiments.

Figure 10:
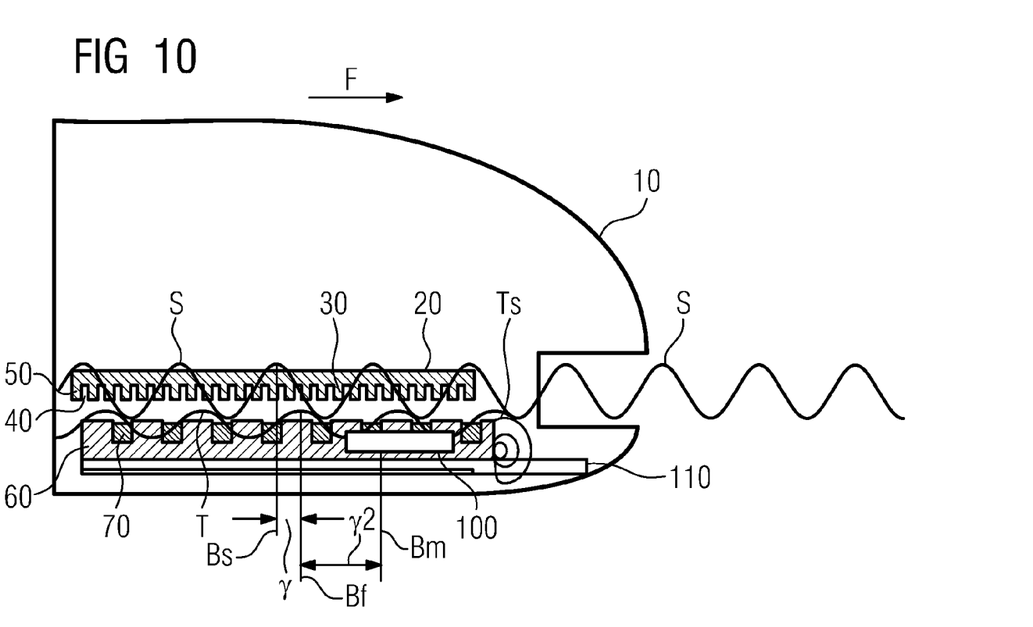
FIG. 10 shows a magnetic levitation vehicle having a pole orientation measurement device which is arranged at the side, alongside the supporting magnets.

As has been explained with reference to the exemplary embodiments described above, the pole orientation measurement device may be fitted in front of the foremost supporting magnet of the magnetic levitation vehicle or behind the rearmost supporting magnet of the magnetic levitation vehicle in the direction of travel. Alternatively and likewise advantageously, the pole orientation measurement device may, however, also be arranged differently, to be precise offset laterally (in the vehicle y direction) adjacent to the supporting magnets 60 of the magnetic levitation vehicle 10, as a result of which the pole orientation measurement device is operated there. By way of example, an arrangement such as this is shown in FIG. 10.

LIST OF REFERENCE SYMBOLS

10 Magnetic levitation vehicle
20 Magnetic levitation railroad track
30 Trackside stator
40 Stator slots
50 Stator teeth
60 Supporting magnet
70 Magnet coils
100 Pole orientation measurement device
110 Mount
140 Evaluation device
E140 Input connection
190 Line
191 Areas with reduced field strength value
192,193 Areas with increased field strength value
MS-MS10 Magnetic field sensors
E1-E10 Individual sensors
Bm Magnetic reference axis of the pole orientation measurement device
Bs Magnetic reference axis of the stator
BS' Auxiliary reference axis
Bf Magnetic reference axis of the magnetic levitation vehicle
H Magnetic field strength
S Fundamental of the stator magnetic field
T Supporting magnet field
Ts Disturbance field component of the supporting magnetic field
V Offset
γ Pole orientation angle
γ2 Offset angle
γ1 Auxiliary pole orientation angle

The invention claimed is:

1. A method of measuring a pole orientation of a magnetic levitation vehicle of a magnetic levitation railroad, which comprises:
   acquiring measured values relating to a stator magnetic field of a trackside stator with at least three magnetic field sensors disposed at a distance in a vehicle longitudinal direction;
   determining a field strength value of the stator magnetic field in each case by way of the measured values of the magnetic field sensors for each magnetic field sensor position;

comparing the measured values with minimum criteria; and determining a pole orientation angle between the stator magnetic field and a magnetic reference axis of the magnetic levitation vehicle by way of at least one subgroup of the measured values of the magnetic field sensors, when the determined field strength values satisfy the predetermined minimum criteria and, otherwise, producing a fault signal.

2. The method according to claim 1, wherein the step of determining the field strength value of the stator magnetic field comprises taking into account a stator magnetic field component in a vehicle x direction and a stator magnetic field component in a vehicle z direction.

3. The method according to claim 2, which comprises forming the field strength value of the stator magnetic field for each magnetic field sensor position from the equation:

$$Hs(x) = \sqrt{H_{sx}^2(x) + H_{sz}^2(x)}$$

where x is a magnetic field sensor position, $Hs(x)$ is the field strength value, $H_{sx}$ is a stator magnetic field component in the vehicle x direction, and $H_{sz}$ is the stator magnetic field component in the vehicle z direction.

4. The method according to claim 3, which comprises measuring the stator magnetic field component in the vehicle x direction and the stator magnetic field component in the vehicle z direction in each case for each magnetic field sensor position, and determining the field strength value by way of measured values for the stator magnetic field component in the vehicle x direction and in the vehicle z direction.

5. The method according to claim 3, which comprises:
measuring the stator magnetic field component in the vehicle x direction or in the vehicle z direction for each magnetic field sensor position; and determining a respectively other stator magnetic field component by computation for each magnetic field sensor position, by way of a measured value at a position offset forward or backward by τ/2 in the vehicle longitudinal direction, where τ is a wavelength of a fundamental of the trackside stator magnetic field.

6. The method according to claim 5, which comprises:
determining first and second field strength values for each magnetic field sensor position;

wherein the first field strength value is formed by way of the stator magnetic field component measured at the magnetic field sensor position and by way of the stator magnetic field component measured offset forward by τ/2 in the vehicle longitudinal direction; and wherein the second field strength value is formed by way of the stator magnetic field component measured at the magnetic field sensor position, and by way of the stator magnetic field component measured offset backward by τ/2 in the vehicle longitudinal direction.

7. The method according to claim 6, which comprises taking into account the measured values at a magnetic field sensor position when at least one of the field strength values that are formed for the respective magnetic field sensor position satisfies the predetermined minimum criteria.

8. The method according to claim 1, which comprises subdividing the measured values of the magnetic field sensors into at least two measured value subgroups, with the measured values in a first measured value subgroup being used to form the pole orientation angle, and with the measured values of the other measured value subgroups being rejected.

9. The method according to claim 8, which comprises checking whether or not a minimum number of field strength values that are located within the first measured value group or within the field strength window belong to directly adjacent magnetic field sensor positions.

10. The method according to claim 8, which comprises determining whether or not the minimum field strength value that is located within the first measured value group or within the field strength window is less than a predetermined minimum value, and generating a corresponding fault signal if appropriate.

11. The method according to claim 10, which comprises:
determining a variance value from the field strength values and comparing the variance value with a predetermined maximum variance value; and using the measured values of the magnetic field sensors to form the pole orientation angle if the variance value is less than the predetermined maximum variance value, and, otherwise, generating a fault signal.

12. The method according to claim 1, which comprises:
determining a minimum possible field strength window that contains a predetermined number of field strength values on a basis of the determined field strength values; and using the measured values for those magnetic field sensor positions for which the associated field strength value is located within the field strength window to form the pole orientation angle, and rejecting the other measured values.

13. The method according to claim 12, wherein a predetermined number of field strength values that must be located within the field strength window is at least 50% of the available field strength values.

14. The method according to claim 12, which comprises determining a window size of the field strength window, and generating a fault signal if the window size of the field strength window exceeds a maximum window size.

15. The method according to claim 14, which comprises determining the maximum window size as a function of a mean value of the field strength values that are located within the field strength window.

16. The method according to claim 15, wherein the maximum window size is less than ±25% of the mean value of the field strength values located within the field strength window.

17. The method according to claim 15, wherein the maximum window size is less than ±10% of the mean value of the field strength values located within the field strength window.

18. The method according to claim 17, wherein the minimum number is a predetermined and fixed number.

19. The method according to claim 17, which comprises defining the minimum number as a function of a number of field strength values that are located within the first measured value group or within the field strength window.

20. The method according to claim 1, forming a mean value by way of the field strength values of the magnetic field sensors, and generating a fault signal if the mean value is less than a predetermined minimum value.

21. A pole orientation measurement device for a magnetic levitation vehicle of a magnetic levitation railroad, comprising:
at least three magnetic field sensors disposed with a spacing distance along a longitudinal direction of the magnetic levitation vehicle, said magnetic field sensors being configured to measure a field strength value of a stator magnetic field component in the longitudinal direction of the vehicle and to measure a field strength value of a stator magnetic field component in a substantially vertical direction;

an evaluation device connected to receive measured values from said magnetic field sensors;

said evaluation device being configured to determine a pole orientation angle between a stator magnetic field of a trackside stator and a magnetic reference axis of the magnetic levitation vehicle by way of the measured values received from said magnetic field sensors; and said evaluation device being configured to determine a field strength value of the stator magnetic field in each case by way of the measured values of the magnetic field sensors for each magnetic field sensor position and to form the pole orientation angle by way of at least one subgroup of the measured values of the magnetic field sensors when the field strength values thus determined satisfy predetermined minimum criteria, and, otherwise, to generate a fault signal.

22. The pole orientation measurement device according to claim 11, wherein said evaluation device includes a data processing device programmed to carry out the method according to claim 1 for evaluating the measured values of said magnetic field sensors.

23. The pole orientation measurement device according to claim 11, wherein said magnetic field sensors are arranged at equal distances.

24. The pole orientation measurement device according to claim 11, wherein said magnetic field sensors are arranged along a line extending parallel adjacent to supporting magnets of the magnetic levitation vehicle.

* * * * *